(12) United States Patent
Kostelnik et al.

(10) Patent No.: US 6,575,663 B2
(45) Date of Patent: Jun. 10, 2003

(54) ADVANCED CONTAINMENT SYSTEM

(75) Inventors: Kevin M. Kostelnik, Idaho Falls, ID (US); Hideki Kawamura, Tokyo (JP); John G. Richardson, Idaho Falls, ID (US); Masaru Noda, Tokyo (JP)

(73) Assignee: Bechtel BWXT Idaho, LLC, Idaho Falls, ID (US)

(*) Notice: Subject to any disclaimer, the term of this patent is extended or adjusted under 35 U.S.C. 154(b) by 0 days.

(21) Appl. No.: 09/729,435

(22) Filed: Dec. 4, 2000

(65) Prior Publication Data
US 2002/0022757 A1 Feb. 21, 2002

Related U.S. Application Data
(60) Provisional application No. 60/169,112, filed on Dec. 6, 1999.

(51) Int. Cl.⁷ .................................................. B09B 1/00
(52) U.S. Cl. .............................. 405/129.57; 405/129.5; 405/129.8
(58) Field of Search .................... 405/129.45, 129.5, 405/129.55, 129.57, 129.6, 129.7, 129.8, 129.85; 588/16, 259, 260

(56) References Cited
U.S. PATENT DOCUMENTS

| | | | | |
|---|---|---|---|---|
| 2,101,285 A | | 12/1937 | Stevens | |
| 5,013,185 A | * | 5/1991 | Taki | 405/128 |
| 5,180,251 A | * | 1/1993 | Paurat et al. | 405/129 |
| 5,199,816 A | * | 4/1993 | Paurat et al. | 405/129 |
| 5,240,348 A | * | 8/1993 | Breaux | 405/128 |
| 5,280,243 A | | 1/1994 | Miller | 324/303 |
| 5,305,798 A | * | 4/1994 | Driver | 138/98 |
| 5,388,931 A | * | 2/1995 | Carlson | 405/274 |
| 5,460,032 A | * | 10/1995 | Hampton et al. | 73/49.2 |
| 5,531,895 A | * | 7/1996 | Alford et al. | 210/610 |
| 5,716,164 A | * | 2/1998 | Biro et al. | 405/128 |
| 5,800,096 A | | 9/1998 | Barrow | |
| 5,816,344 A | | 10/1998 | Turner | 175/40 |
| 5,816,748 A | * | 10/1998 | Kleiser et al. | 405/268 |
| 5,905,184 A | * | 5/1999 | Carter, Jr. | 588/260 |
| 5,961,437 A | * | 10/1999 | Smith et al. | 588/249 |
| 6,102,617 A | * | 8/2000 | Hampton | 405/52 |
| 6,138,752 A | * | 10/2000 | Bass et al. | 166/250.01 |

* cited by examiner

Primary Examiner—Heather Shackelford
Assistant Examiner—John Kreck
(74) Attorney, Agent, or Firm—Workman Nydegger & Seeley

(57) ABSTRACT

A containment system to isolate waste in the ground including parallel interlocking tubes.

38 Claims, 6 Drawing Sheets

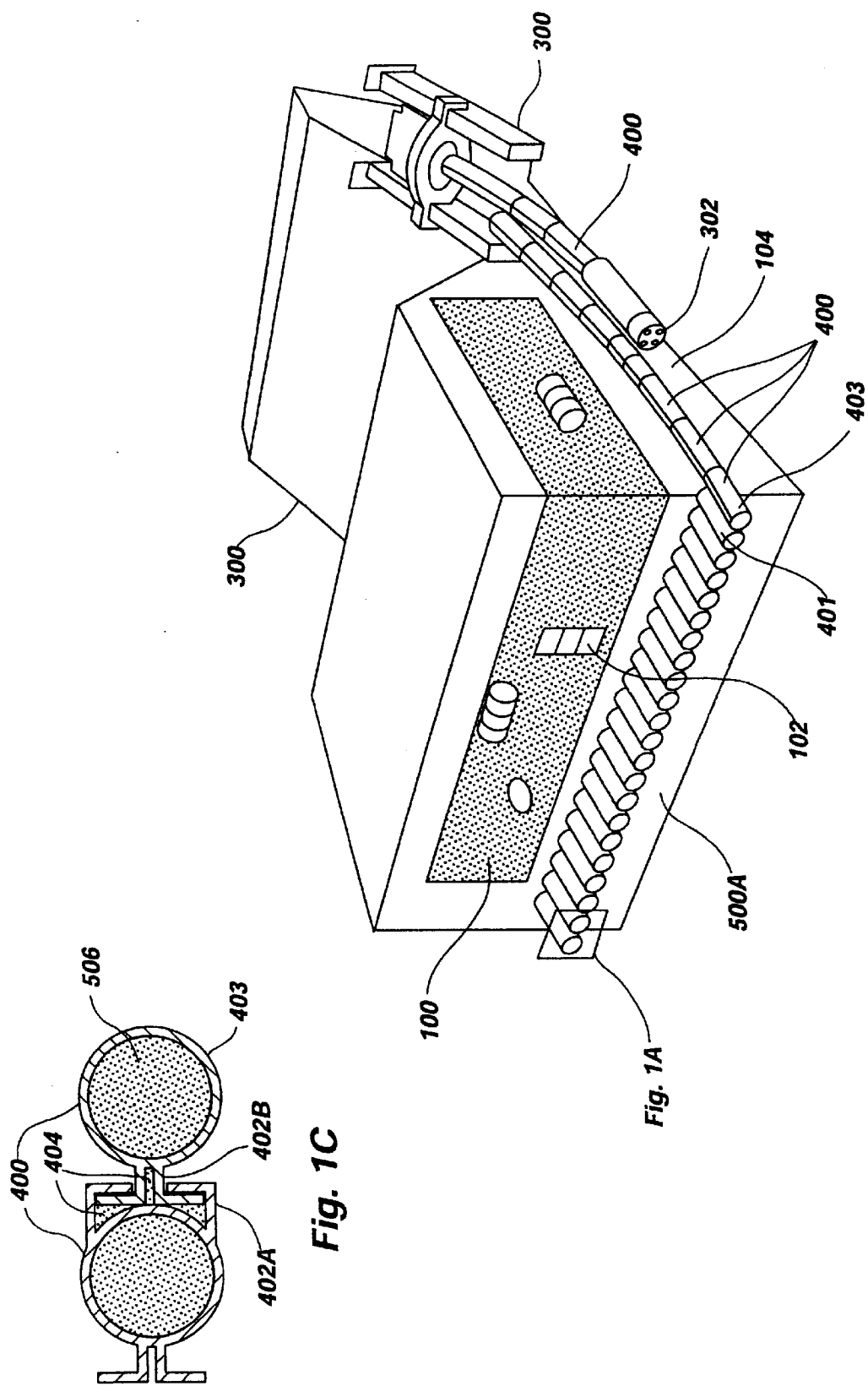

ADVANCED CONTAINMENT SYSTEM

RELATED APPLICATION

This application claims priority from United States provisional application Ser. No. 60/169,112 filed Dec. 6, 1999 and is incorporated by reference.

CONTRACTUAL ORIGIN OF THE INVENTION

This invention was made with United States Government support under Contract No. DE-AC07-94ID13223, now Contract No. DE-AC07-99ID13727 awarded by the United States Department of Energy. The United States Government has certain rights in the invention.

BACKGROUND OF THE INVENTION

1. Field of the Invention

The present invention relates generally to methods and devices for in situ containment of buried waste. More particularly, embodiments of the present invention relate to an improved barrier, as well as to its installation and use, for reliably containing and managing leachate from buried waste.

2. Prior State of the Art

Management and disposal of various types of waste are long-standing problems. Early waste management and disposal systems were primitive, because there were no disposal or environmental regulations in place at the time. In countless instances, the waste was simply buried underground. The volume of waste that has been buried is tremendous. Some experts estimate that landfills in the United States alone hold more than 3 million cubic meters of buried waste. Further, much of the waste that was buried comprises heavy metals such as mercury and cadmium, carcinogenic materials such as trichloroethylene, radioactive materials, and other hazardous substances.

While burial and similar approaches produced an aesthetically pleasing result by removing the waste from sight, it was soon discovered that effluent from the buried waste was working its way through the soil and into the groundwater. This process is commonly known as leaching. Because groundwater is a major source of water for drinking and for agriculture, contamination of the groundwater by leaching is a major concern.

The contamination caused by buried waste is not limited solely to groundwater however. At least some of the groundwater finds its way into waterways such as streams, rivers, and lakes, thus polluting those waterways and poisoning the plant and animal life. Obviously, polluted waterways pose a threat to humans as well, particularly in the case of waterways and bodies of water used for recreational purposes and/or as a source of drinking water.

Not all of the cases of groundwater pollution arise from the leaching of chemicals from waste sources. In some cases, the waste is buried in the path of the groundwater and as groundwater flows through the waste, it collects various chemicals and toxins from the waste, and deposits those chemicals and toxins in other soils and waterways.

Clean soil and groundwater are important to human, plant, and animal life as well as to the environment in general. Accordingly, a variety of methods and devices have been devised to attempt to resolve the problems induced by buried waste. These remedies can be broadly grouped into the categories of remediation and containment. Remediation remedies focus on processes designed to change the chemical composition of a contaminated material or contaminant, while containment remedies seek to eliminate the pollution problem by removing or isolating the contaminants and contaminated material from the surrounding area.

Remediation approaches such as biological treatments, thermal processes and chemical processes are problematic for a variety of reasons. In particular, many of these remediation techniques are expensive and potentially hazardous. Further, it is difficult to verify the effectiveness of many of the treatments and remediation-type approaches may not be appropriate for all types of contaminated material. Finally, determining the proper remediation technique is, in itself, a complex and time-consuming process, particularly in view of the web of regulations and procedures that govern such treatments.

Containment, barrier, or in situ, approaches are problematic as well. One known containment approach is simply to dig up and remove the contaminated soil for treatment and/or disposal. This approach is expensive and time-consuming and often accomplishes little more than moving the problem to another location. Other containment approaches involve installing vertical and/or horizontal barriers around the buried waste. In theory, this approach is attractive because it does not involve digging up or otherwise disturbing the buried waste.

However, these containment or barrier systems suffer from a variety of inadequacies including lack of durability, continuity and integrity. These inadequacies are a function of numerous factors including, but not limited to: exposure to harsh chemicals such as concentrated saline solutions, and saturated calcite and gypsum solutions; exposure to extreme thermal gradients such as are typically experienced in freeze/thaw zones; and exposure to stresses induced by shifting in the earth.

The hydraulic conductivity, which is the rate at which a fluid or hazardous substance flows through a barrier, is unacceptably high in some barrier systems and other typical barrier systems are not particularly well-suited to a variety of soil conditions such as hard rock and sand. A further flaw is that many barrier systems do not provide methods for evaluating the integrity of the barrier during and after installation, which is complicated by the fact that many barrier systems also lack provision for long term monitoring of the containment zone and the leachate therefrom. The inability to monitor a barrier system that is isolating hazardous waste is unacceptable because of the potential harm that can be caused to the environment. The lack of durability, continuity and integrity in known containment systems has a significant effect on the performance of those systems and the effectiveness of those containment and barrier systems cannot be readily determined or evaluated.

Accordingly, what is needed is an improved in situ containment system and a method for installing the system. Specifically, the containment system should be durable so as to maintain both integrity and effectiveness under a variety of physical and thermal conditions as well as adaptable to wide range of soil types and conditions. The containment system should be chemically stable and impervious to attack by the chemicals, compounds, and microbes typically encountered in buried waste. The containment system should also have a low hydraulic conductivity so as to minimize the passage of fluids and chemicals through the barrier and the containment system should monitor the integrity of the barrier both during and after installation. Further, the containment system should be capable of long-term monitoring of the zone enclosed by the containment system and should also be capable of monitoring the leachate from the zone of interest. Also, both the system and the method for installing the containment system should be relatively simple and cost-effective. Finally, the installation method should ensure that the containment system is properly placed and oriented.

OBJECTS AND SUMMARY OF THE INVENTION

The present invention has been developed in response to the current state of the art, and in particular, in response to these and other problems and needs that have not been fully or completely solved by currently available waste containment systems and methods.

Thus, it is an overall object of one embodiment of the present invention to provide a simple yet cost-effective waste containment system that is particularly useful for in situ monitoring, control, and management of buried waste and associated leachate.

It is another object of one embodiment of the invention to provide a containment system including one or more barriers comprised of interlocking steel casing sections so as to facilitate a durable, impervious and chemically stable containment system having a high degree of continuity and integrity.

A further object of one embodiment of the present invention is to impart added integrity and durability to the barrier by filling the metallic casing sections with an impervious material.

Another object of one embodiment of the present invention is to provide a containment system that employs embedded sensors for long-term monitoring of the integrity of the barriers and for monitoring the containment zone and leachate.

It is also an object of one embodiment of the present invention to provide a containment system installation method that is cost-effective.

Finally, it is an object of one embodiment of the present invention to provide a containment system installation method which will ensure accurate placement and orientation of the containment system.

The effects of buried waste on the environment can be quite profound and are not limited to the area in which the buried waste is located because chemicals, toxins and other hazardous substances associated or produced by the buried waste are frequently introduced into the groundwater and carried to other parts of the environment. These chemicals and other dangerous substances may ultimately be found in drinking water, irrigation water, rivers, lakes, and other sources of water. In this manner, buried waste has an adverse effect on the health of people, plants, and animals and also harms the environment.

In many instances, the buried waste is difficult to move and relocation of the buried waste may actually cause more harm. In these and other instances, it is desirable to contain the buried waste by surrounding the buried waste with a barrier that effectively isolates the buried waste. The containment systems and barriers of the present invention provide an advanced containment system that is continuous, durable, and capable of performing in a variety of geologic and environmental conditions. Additionally, the effectiveness of the advanced containment system is able to be verified over a sustained time period.

In a preferred embodiment, the containment system includes one or more barriers comprising a plurality of metal casing sections longitudinally connected by interlocking structure present on each casing. The barriers cooperate with one or more concrete walls to collectively enclose at least a portion of the buried waste.

Preferably, a barrier is first installed underneath the zone of interest. Specifically, a line of individual steel casing sections are placed by a micro-tunneling device or the like which simultaneously excavates a tunnel and installs connecting casing segments behind the micro-tunneling device as tunneling progresses. The length of the tunnels is determined by the size of the zone of interest to be contained. Preferably, the tunneling device includes a system for ensuring accurate placement and orientation of the tunnels and casing sections. As each tunnel is dug and lined with casing sections, a successive adjacent tunnel is dug and casing sections situated therein which longitudinally interlock with the casing sections placed in the previously excavated tunnel, so as to form a continuous barrier of predetermined width.

The casing sections and the joints whereby they interlock are preferably filled with grout or the like so as to provide an added measure of strength, durability, and imperviousness to the barrier. In a preferred embodiment, two vertical barriers are interlocked with the ends of the horizontal barrier so that the horizontal barrier and vertical barriers collectively form a continuous U or channel-shaped containment boundary around the zone of interest. Preferably, the horizontal and/or vertical barriers include sensors installed contemporaneously so as to permit monitoring of the integrity and performance of the barriers during and after installation. In a preferred embodiment, the barriers also include sensors for long-term monitoring of the zone of interest and associated leachate.

After the channel has been completed, a concrete wall is installed at either end of the containment area, thereby cooperating with the barriers to enclose the containment area on all sides except the top. Optionally, at least one of the barriers has one or more openings in fluid communication with a collection system or the like so that leachate flowing through the opening can be monitored, collected, and processed.

Additional objects and advantages of the present invention will be set forth in the description which follows, and in part will be obvious from the description, or may be learned by the practice of the invention. The objects and advantages of the invention may be realized and obtained by means of the instruments and combinations particularly pointed out in the appended claims. These and other objects and features of the present invention will become more fully apparent from the following description and appended claims, or may be learned by the practice of the invention as set forth hereinafter.

BRIEF DESCRIPTION OF THE DRAWINGS

In order to more fully understand the manner in which the above-recited and other advantages and objects of the invention are obtained, a more particular description of the invention will be rendered by reference to specific embodiments thereof which are illustrated in the appended drawings. Understanding that these drawings depict only typical embodiments of the invention and are not therefore to be considered to be limiting of its scope, the invention and its presently understood best mode for making and using the same will be described and explained with additional specificity and detail through the use of the accompanying drawings in which:

FIG. 1C illustrates a cross-section view of one embodiment of the interlock structure between adjacent casing sections;

DETAILED DESCRIPTION OF THE PREFERRED EMBODIMENTS

The threat to the environment produced by buried waste begins when the contaminants produced by buried waste leach into the groundwater. Once groundwater has been contaminated, the potential harm is great, because groundwater typically makes its way to rivers and lakes, which are frequently sources of drinking water and irrigation water. In this manner, the contaminants originally produced by buried waste make their way to plants, animals and humans.

The advanced containment system (ACS) of the present invention addresses these and other concerns of buried waste by isolating a zone of interest, which provides several significant advantages. The ACS is capable of creating a continuous barrier of various sizes and configurations. The barriers can be installed in both saturated and unsaturated zones of interest and in a variety of geologies from soft soil to hard rock. ACS provides for the verification of the barrier installation as well as structural continuity of the barrier. ACS also significantly improves the hydraulic performance of the barrier, allows the performance of the barrier to be monitored for an extended period of time, and is cost effective.

As used herein, "buried waste" refers to: construction and demolition materials such as lumber and concrete blocks; laboratory equipment such as glassware and tubing; process equipment such as valves, ion exchange resins, and heat exchangers; maintenance equipment such as oils and greases; decontamination materials such as paper, rags and plastics; hazardous and radioactive materials; and any other type of waste or garbage which is buried in the ground. The chemicals and other substances produced by buried waste which leaches into the surrounding soil and groundwater are also encompassed by the term buried waste. "Zone of interest" refers to an area or volume of ground containing buried waste. A containment system is typically designed to isolate the zone of interest from the surrounding earth and water such that the buried waste and associated leachate is geographically confined to the zone of interest.

The present invention is described in terms of diagrams and figures. Using the diagrams and figures in this manner to present the invention should not be construed as limiting its scope. Rather, the diagrams and figures are intended to be exemplary embodiments of the present invention. Additionally, the diagrams and figures are not necessarily drawn to scale.

In general, the present invention relates to advanced containment systems for use in in situ monitoring, controlling, and management of buried waste and associated leachate. FIGS. 1 through 4 indicate various presently preferred embodiments of an advanced containment system. Other embodiments of the present invention may also be available and such figures are not intended to be limiting.

Figures 1, 1A, 2, 3:
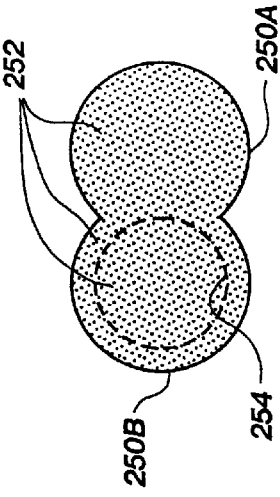
FIG. 1 is a perspective view of a micro tunneling device installing casing sections underneath the zone of interest.
FIG. 1A illustrates a cross-section view of one embodiment of simultaneous double tunnel excavation, looking towards the front end of the tunnels, and indicates the interconnection between adjacent tunnels.
FIG. 2 is a perspective view of an embodiment of the installed containment system.
FIG. 3 is a depiction of an embodiment of a barrier adapted for leachate collection and processing.
Figures 1, 1A, 2:
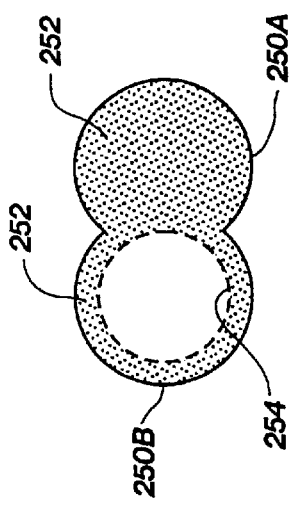
Figures 1, 1A:
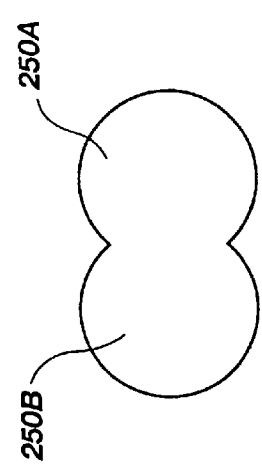

FIG. 1 depicts a zone of interest 100 to be isolated by a containment system. In order to contain zone of interest 100, a trench 200 is first dug on either side of zone of interest 100 (only one trench is shown) containing buried waste 102. Micro tunneling device 300 is then placed in trench 200. Trench 200 facilitates the introduction of micro tunneling device 300, but the creation of trench 200 may be omitted in some embodiments. If trench 200 is dug, the soil, if contaminated, is disposed of by appropriate and approved methods. Additionally, any soil excavated by tunneling device 300 is also collected, scanned, and disposed of by similar methods.

One type of micro tunneling device 300 is known as a micro tunnel boring machine, or micro TBM. In a preferred embodiment, micro tunneling device 300 comprises an auger head 302 or the like for rotary excavation of soil 104. However, it is contemplated that the inventive barrier system may be installed in any of a number of different types of soil and rock, or combinations thereof. Accordingly, installation of the containment or barrier system by other excavation devices including, but not limited to, 'double-tube down the hole' drills (preferred for hard soil and soft rock), rotary percussion drills (preferred for hard rock), Multi-face Tunnel Boring Machine, Multi-face Shielded Tunnel Boring Machine, Shielded Tunnel Boring Machine coupled with a Horizonal Cutting Screw Auger, Pipe Propulsion, Curved Pipe Propulsion, Trench Cutting, and the like is contemplated as being within the scope of this invention. Preferred construction speeds are about 8 meters/day of tunnel through soft soil, about 5 25 meters/day of tunnel through hard soil/soft rock, and about 8 meters/day of tunnel through hard rock.

In order to contain the buried waste in a zone of interest, micro tunneling device 300 serially drills a plurality of parallel tunnels underneath the zone of interest. Preferably, each tunnel is substantially circular in cross-section. However, this invention contemplates as within its scope tunnels of a wide variety of different cross sectional shapes. Each tunnel begins in trench 200 and ends in trench 200 (not shown) on the other side of zone of interest 100. Micro tunneling device 300 lines each tunnel with casing sections 400 so as to form a tube 401 inside each tunnel as drilling progresses. One of the functions of casing sections 400 installed during tunneling is to support the portion of the tunnel already drilled. In a physically supportive matrix such as hard rock, casing sections 400 may not be required. In a preferred embodiment, casing sections 400 comprise a body 403 optimally constructed of steel or the like. However, alternative casing materials that would provide the functionality and durability of steel are contemplated as being within the scope of this invention. Alternative casing materials include, but are not limited to, concrete and the like.

In a preferred embodiment, each tunnel is about 0.5 meters in diameter. Further, it is preferred that the tunnels be in the range of about 50 meters to about 150 meters long.

An alternative embodiment is depicted in steps (i) through (vi) of FIG. 1A. In this embodiment, two parallel overlapping tunnels 250A and 250B, respectively, are excavated substantially simultaneously (step (i)) by micro tunneling device 300 (not shown). Overlapping tunnels 250A and 250B are preferably substantially circular in cross-section. However, this invention contemplates as within its scope tunnels of a wide variety of different cross sectional shapes. Micro tunneling device 300 preferably comprises a double multiface TBM or the like. As excavation progresses, overlapping tunnel 250A is substantially filled with barrier filler 252 (step (ii)). Barrier filler 252 preferably comprises grout, cement, concrete, bentonite-based materials, modified cement, polysiloxane, acrylic polymers, or the like. Substantially simultaneously with excavation of overlapping tunnels 250A and 250B, and backfilling of overlapping tunnel 250A, barrier filler forms 254 are placed in overlapping tunnel 250B and barrier filler 252 is poured or injected about barrier filler forms 254 as indicated in FIG. 1A (step (ii)) so as to form a hollow tube made of barrier filler 252. After overlapping tunnel 250B has been completely excavated, it is backfilled with barrier filler 252 (step (iii)). The process then is then repeated, a portion of overlapping tunnel 250B being cut out (see FIG. 1A) as part of the excavation of overlapping tunnel 250A' and the excavation sequence is repeated as required (steps (iv) through (vi)). In this alternative embodiment, no casing sections 400 are required.

Figures 1, 1A, 2, 3, 4, 5:
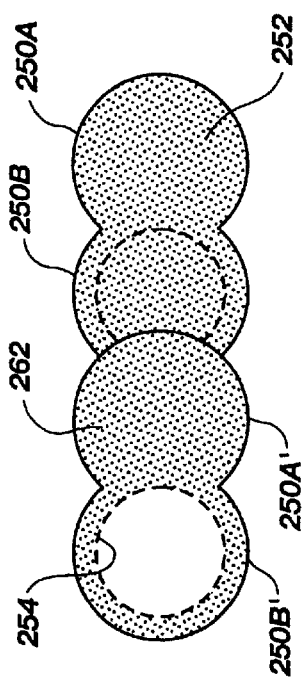
FIG. 4 is a schematic of a casing section having a plurality of sensors for monitoring the zone of interest and the barrier.
Figures 1, 1A, 2, 3, 4:
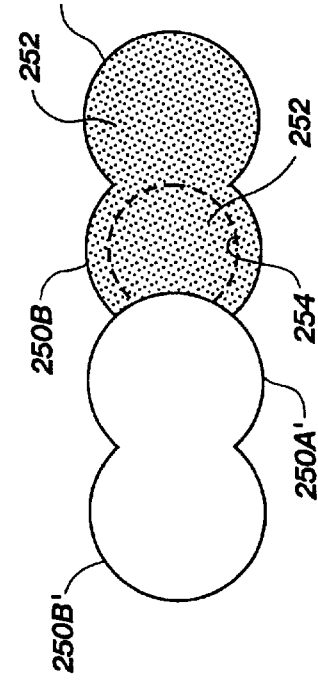
Figures 1, 1A, 2, 3, 4, 5, 6:
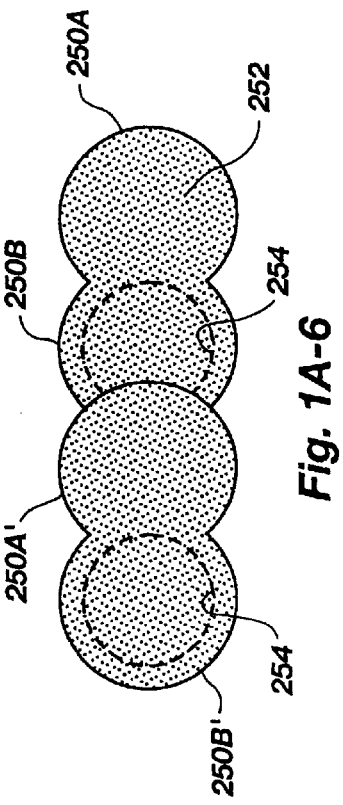
Figures 1, 1B, 2, 3:
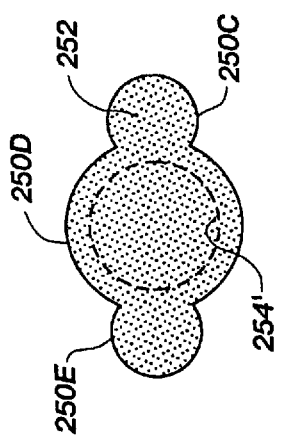
FIG. 1B illustrates a cross-section view of one embodiment of simultaneous triple tunnel excavation, looking toward the front end of the tunnels, and indicates the interconnection between adjacent tunnels.
Figures 1, 1B, 2:
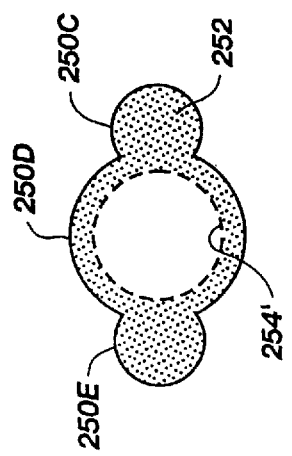
Figures 1, 1B:
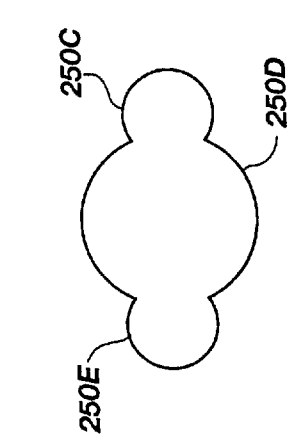
Figures 1, 1B, 2, 3, 4, 5:
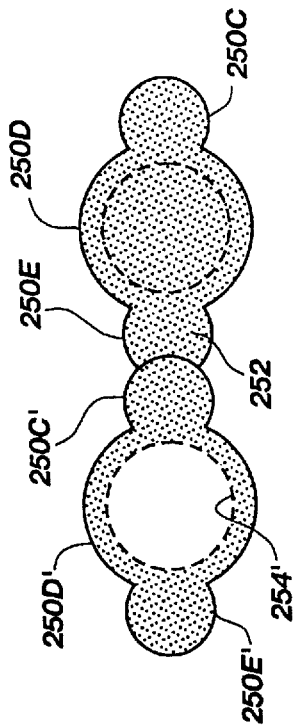
Figures 1, 1B, 2, 3, 4:
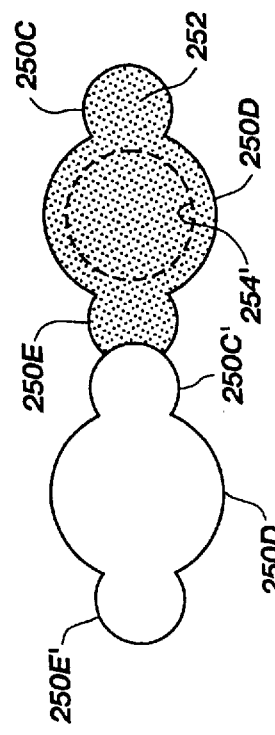
Figures 1, 1B, 2, 3, 4, 5, 6:
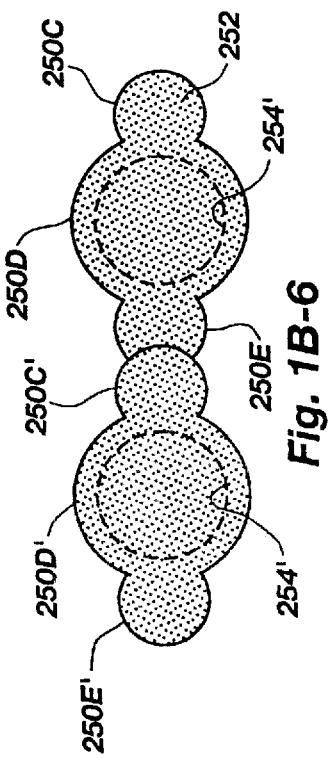
Figure 2:
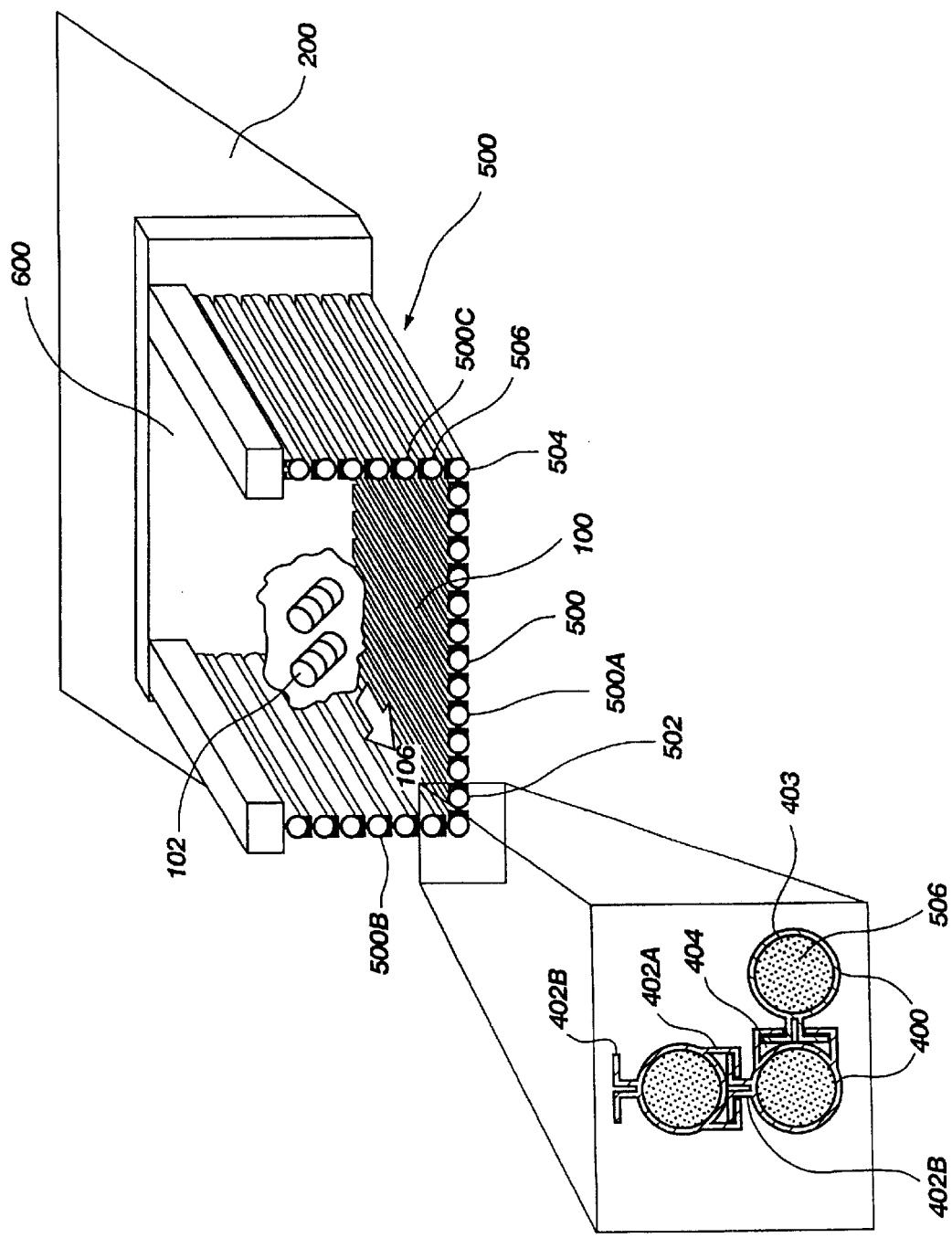
Figure 3:
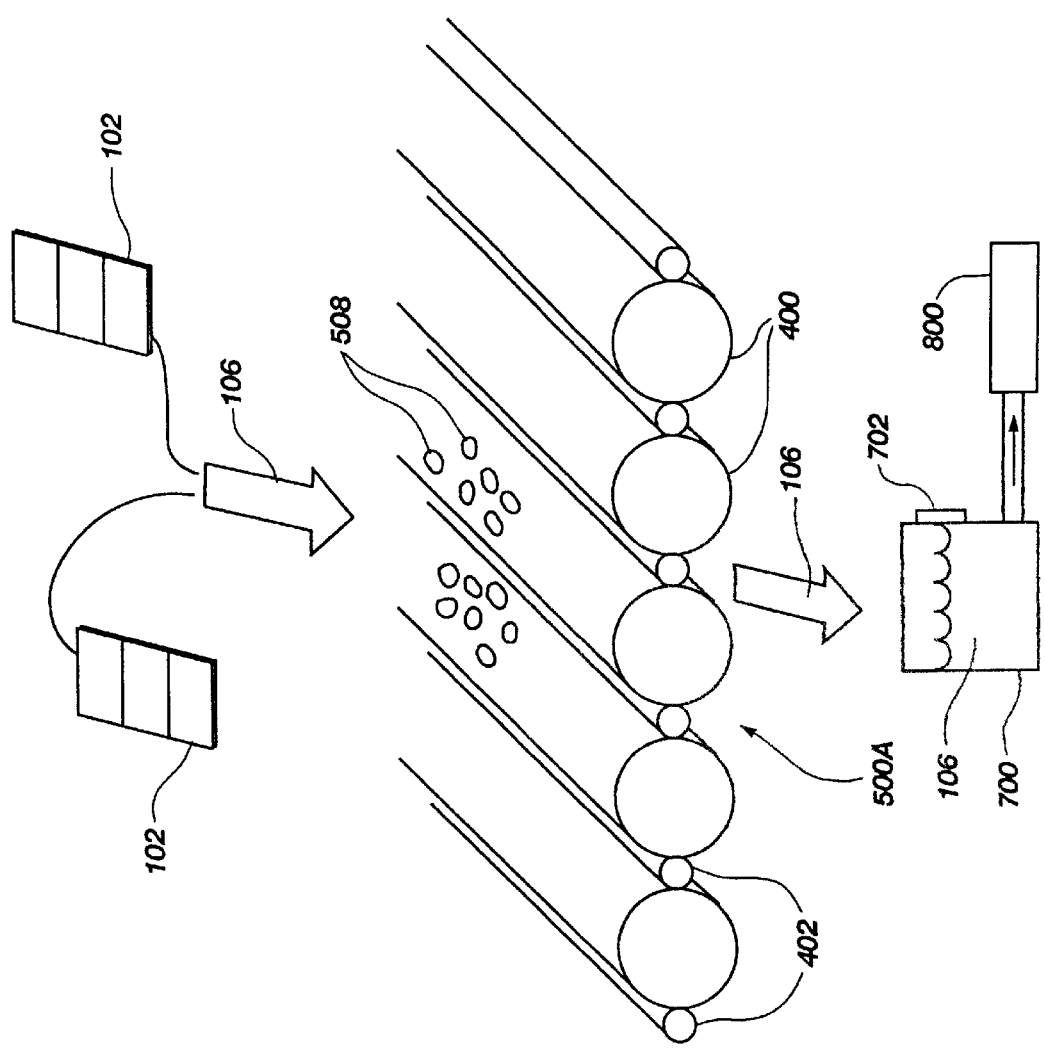
Figure 4:
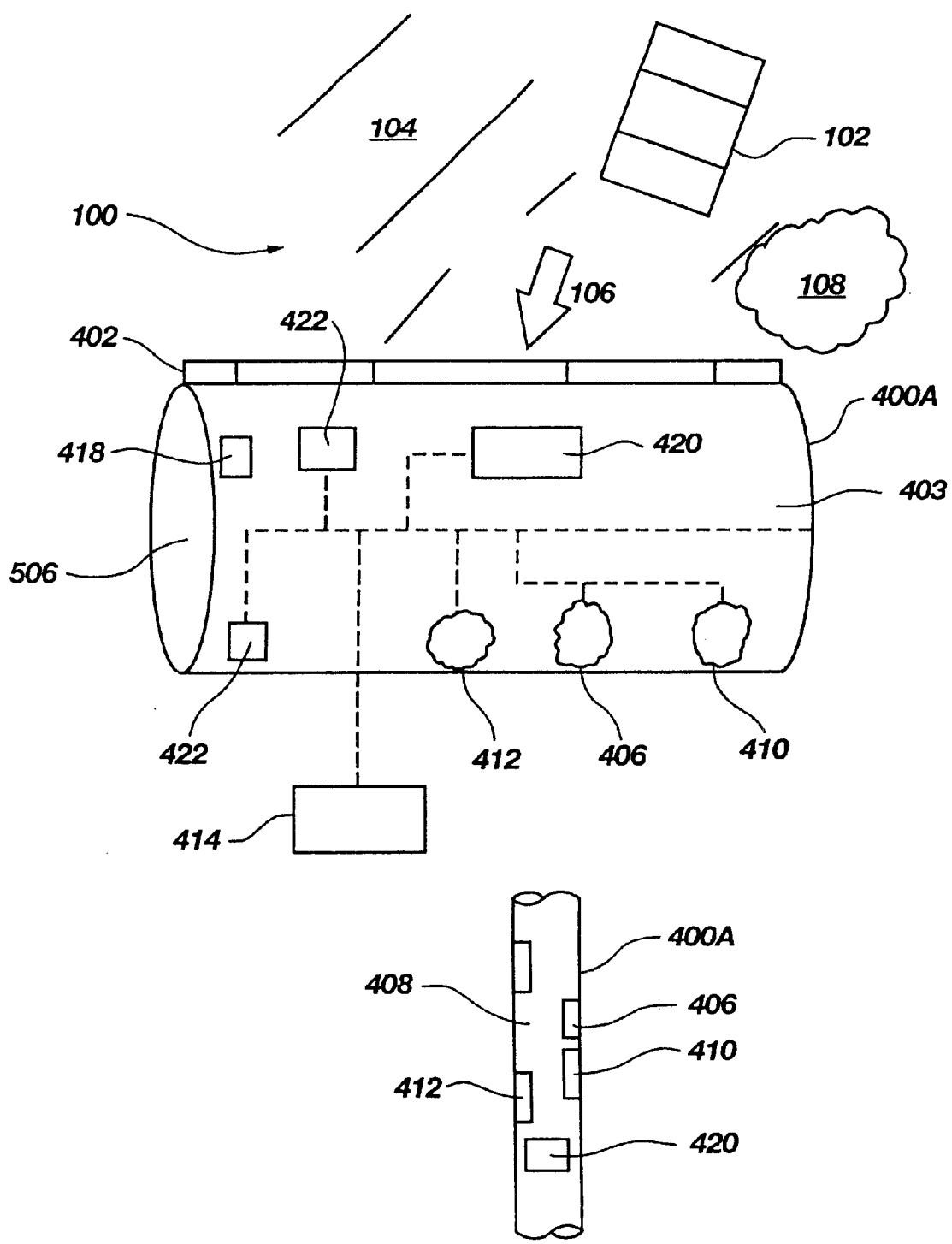

Yet another alternative embodiment is depicted in steps (i) through (vi) of FIG. 1B. In this embodiment, three parallel overlapping tunnels 250C, 250D, and 250E, respectively, are excavated substantially simultaneously by a tunneling device (not shown) such as a triple multiface shield machine or the like. Alternatively, the tunneling device (not shown) comprises two shielded TBMs having a horizontal slot/auger cutter positioned therebetween so as to reduce the volume of excavated soil and the amount of barrier filler 252 subsequently required for filling. Overlapping tunnels 250C, 250D, and 250E are preferably substantially circular in cross-section. However, this invention contemplates as within its scope tunnels of a wide variety of different cross sectional shapes.

As excavation progresses, overlapping tunnels 250C and 250E are substantially filled with barrier filler 252. Substantially simultaneously with excavation of overlapping tunnels 250C, 250D and 250E, and backfilling of overlapping tunnels 250C and 250E, barrier filler forms 254' are placed in overlapping tunnel 250D and barrier filler 252 is poured or injected about barrier filler forms 254' as indicated in step (ii) of FIG. 1B. After overlapping tunnel 250D has been completely excavated, it is backfilled with barrier filler 252 as indicated in step (iii) of FIG. 1C. Alternatively, tunnel 250D may be left open. As indicated in steps (iv) through (vi) of FIG. 1B, the process then is then repeated, a portion of overlapping tunnel 250E being cut out as part of excavation of overlapping tunnel 250C' and the excavation sequence repeated as required. In this alternative embodiment, no casing sections 400 are required.

With continuing reference now to FIG. 1, micro tunneling device 300 preferably includes a control system (not shown) for ensuring accurate drilling. Alignment and orientation of the first tunnel drilled is critical as all subsequent tunnels are drilled with reference to the first tunnel. In particular, as subsequent tunnels are drilled and lined with casing sections 400, each casing section 400 installed in a subsequently drilled tunnel is longitudinally interlocked with an adjacent casing section 400 in the previously drilled and lined tunnel so that a continuous barrier segment 500A is formed as indicated in FIG. 1. In a preferred embodiment, barrier segment 500A is substantially horizontal.

One embodiment of complementary interlocking structure 402A and 402B adapted to interlock adjacent casing sections 400 is indicated in FIG. 1C. Complementary interlocking structure 402A and 402B provides the dual benefit of positively interlocking adjacent casing sections 400 and, once the first tunnel is drilled and lined with casing sections 400, complementary interlocking structure 402B serves to accurately and reliably guide complementary interlocking structure 402A of adjacent casing sections 400 into place, thus ensuring accurate placement and orientation of those casing sections 400 and thus of barrier segment 500A as a whole. Note that complementary interlocking structure 402A and 402B represents only one possible embodiment of structure in accordance with the teachings of this invention, and this invention is not considered to be limited thereto. It is contemplated that any of a wide variety of structural arrangements could profitably be employed to achieve the functionality of complementary interlocking structure 402A and 402B and, accordingly, those structural arrangements are contemplated as being within the scope of the present invention as well. Two possible alternative interlock arrangements, previously discussed, are indicated in FIGS. 1A and 1B, respectively.

Once barrier segment 500A is installed, barrier segments 500C and 500B are installed in like manner by micro tunneling device 300 (not shown) to produce the U-shaped configuration indicated in FIG. 2. In particular, barrier segment 500B interlocks with barrier segment 500A at edge casing 502, by way of complementary interlocking structure 402A and 402B, and excavation and lining of subsequent tunnels proceeds substantially vertically upward from edge casing 502 until barrier segment 500B reaches a desired height. In similar fashion, barrier segment 500C employs complementary interlocking structure 402A or the like to interlock with complementary interlocking structure 402B or the like on barrier segment 500A at edge casing 504, the excavation and lining of subsequent tunnels proceeding vertically upward from edge casing 504 until barrier segment 500C reaches a desired height. Note that while a preferred embodiment indicates a substantially U-shaped barrier 500 formed by three barrier segments 500A, 500B, and 500C, this invention contemplates as within its scope other barriers having the same functionality as the U-shape including, but not limited to, a V-shaped configuration.

Upon installation of barrier segments 500A, 500B, and 500C, casing sections 400 and interlock spaces 404 are preferably filled with a barrier filler 252 such as grout, cement, concrete, bentonite-based materials, modified cement, polysiloxane, acrylic polymers, or the like, as indicated in FIG. 2. When filled, interlock spaces 404 provide a connection having the same integrity, performance and functionality as casing sections 400 when casing sections 400 are filled. Barrier filler 252 thus cooperates with steel casing sections 400 to produce a barrier 500 that is chemically stable, even when exposed to solutions saturated with calcite, gypsum, and the like. Further, barrier 500 has a high degree of continuity, and resists attack by chemicals, microbes, and the like. Additionally, resulting barrier 500 has a low hydraulic conductivity K, preferably, $K \leq 10^{-7}$ cm/sec, so that barrier 500 is substantially impermeable by leachate 106 generated by buried waste 102. Finally, resulting barrier 500 is thermally stable and retains its integrity and effectiveness under a wide variety of physical and thermal conditions including ground shifting, and large temperature gradients. Barrier 500 is particularly well-suited for use in freeze/thaw conditions and conditions where heavy precipitation causes high levels of groundwater flow.

Note that a variety of means may be profitably employed to perform the functions, enumerated herein, of barrier segments 500A, 500B and 500C. Barrier segments 500A, 500B, and 500C are examples of barrier means for limiting migration of leachate and for containing buried waste in a zone of interest. Accordingly, the structure disclosed herein simply represents one embodiment of structure capable of performing these functions. It should be understood that this structure is presented solely by way of example and should not be construed as limiting the scope of the present invention in any way.

Once barrier segments 500A, 500B, and 500C have been installed and filled with barrier filler 252, concrete walls 600 (one wall shown removed for clarity) are installed and positioned in trench 200 (one trench shown removed for clarity) so as to abut barrier segments 500A, 500B, and 500C, as indicated in FIG. 2. Thus, walls 600 cooperate with barrier 500 to form a containment system that substantially contains zone of interest 100 and prevents buried waste 102 and associated leachate 106 from escaping from zone of interest 100.

Walls 600 preferably comprise concrete, grout, bentonite-based materials, or the like. In an alternative embodiment, only barrier segment 500A (FIGS. 1 and 2) is installed, and walls 600 (FIG. 2) are installed in place of barrier segments 500B and 500C. Alternatively, barrier segment 500A is curved such that the ends extend above the zone of interest, in which case the need for walls 600 is obviated. This invention further contemplates as within its scope a variety of combinations and arrangements of barrier segments and walls including, but not limited to, those combinations and arrangements discussed herein.

In an alternative embodiment, illustrated in FIG. 3, barrier segment 500A is configured to facilitate collection and processing of leachate 106 produced by buried waste 102. In particular, at least some casing sections 400 are left unfilled, i.e., not filled with barrier filler 252, and are perforated with holes 508 collectively forming an opening or 'window' so as to permit leachate 106 to flow down into casing sections 400 where it can be collected and routed to an accumulation tank 700 or the like for holding and subsequent processing by processing system 800. In a preferred embodiment, accumulation tank 700 includes sensors 702 or the like for monitoring various parameters including, but not limited to, leachate accumulation levels. In a preferred embodiment, processing system 800 analyzes and/or processes, by any of a variety of well known methods, said leachate to extract chemicals, minerals, metals, and other desired material. Such known methods contemplated as being within the scope of the present invention include, but are not limited to, filtration and the like.

Finally, a critical feature of the inventive containment system is the ability to monitor the integrity and performance of the containment system. The monitoring system also has a predictive capacity which allows it to predict potential problem areas and failures in the containment system. Additionally, the monitoring system of the present invention detects emissions and flow of leachate 106 from zone of interest 100. Monitoring of leachate 106 and other emissions is important because, among other things, it permits site operators to evaluate the condition and composition of zone of interest 100.

As indicated in FIG. 4, a 'smart' casing section 400A is contemplated that incorporates a variety of embedded sensors for performing the aforementioned functions. As used herein, 'embedded sensors' refer to those sensors located either internal to casing sections 400A, and/or located on the exterior surface 408 of casing sections 400A. A preferred embodiment of smart casing section 400A contemplates both internal and external sensors. With reference first to external sensors, presence/concentration sensor 406 is recessed in exterior surface 408 of smart casing section 400A and measures both the types and concentration of contaminants 108, whether present in leachate 106 or in soil 104. In similar fashion, distribution sensor 410 is recessed in exterior surface 408 of smart casing section 400A and measures the spatial distribution of contaminants 108 and/or leachate 106 in soil 104. Likewise, radiation detection and measurement ('RDM') sensor 412 is recessed in exterior surface 408 of smart casing section 400A and monitors and reports radiological activity in zone of interest 100. In a preferred embodiment, presence/concentration sensor 406, distribution sensor 410, and RDM sensor 412 are installed on smart casing section 400A in locations remote from complementary interlocking structure 402A and 402B.

In addition to their respective sensing functions, presence/concentration sensor 406, distribution sensor 410, and RDM sensor 412 are configured to feed data to real-time data management system 414 for processing and analysis. Preferably, real-time data management system 414 comprises a computer-based application that integrates hardware, software, sensor output, positioning information and data analysis functions.

A variety of different sensor types are contemplated as being suitable for performing the functions of presence/concentration sensor 406, distribution sensor 410, and RDM sensor 412. In particular, the function of presence/concentration sensor 406 is preferably performed by a surface acoustic wave (SAW) sensor or solid state sensor such as a field effect transistor (FET), as well as by Fourier transform infrared spectrometry (FTIR), time domain electromagnetics, or the like. Time domain electromagnetics, which measure presence, location, and concentration of contaminants by measuring conductivity and dielectric contrasts of the medium in which they are located, are also suitable for performing the spatial distribution measurement function of distribution sensor 410. The radiation detection and measurement functions of RDM sensor 412 is preferably performed by gamma-ray spectrometry, plastic scintillators, scintillating fibers, miniature chamber detectors, or the like. Note that this invention contemplates as within its scope various other types of sensors that will provide the functionality described herein.

As indicated in FIG. 4, smart casing section 400A also includes a variety of internal sensors for performing a number of different functions relating to the integrity of smart casing section 400A. Because these sensors are internal to smart casing section 400A, they permit monitoring of various aspects of the installation while the installation is in progress. In view of the fact that the joints between successive smart casing sections 400A represent a potential leak-through path for leachate 106 and contaminants 108, the integrity of those joints is of particular concern. Accordingly, joint integrity sensor 418 evaluates the integrity of the joint between successive smart casing sections 400A. That is, joint integrity sensor 418 determines whether there are cracks, voids, or other defects in the joint that could permit leak through of leachate 106 and/or contaminants 108, and joint integrity sensor 418 also detects the onset and growth of cracks and voids. As with presence/concentration sensor 406, distribution sensor 410, and RDM sensor 412, joint integrity sensor 418 is configured to feed data to real-time data management system 414 for processing and analysis.

Joint integrity can be evaluated in several different ways. Preferred sensors for performing this function include acoustic/ultrasonic time domain reflectometry sensors that detect cracks and large voids in structures such as smart casing section 400A. Also, known optical fiber sensors employ fiber optic principles to make strain measurements in smart casing section 400A and thereby detect the onset and growth of voids and cracks in smart casing section 400A. Because joint integrity can be meaningfully evaluated in a variety of different ways, this invention contemplates as within its scope any sensor type that would be suitable for directly or indirectly measuring and evaluating joint integrity. Note also that the aforementioned sensor types are equally suitable for evaluating the integrity of the structure of smart casing section 400A itself, that is, they are not limited solely to joint integrity applications.

In addition to containing sensors for evaluating smart casing section 400A structure and joint integrity, smart casing section 400A of the inventive barrier also includes migration sensor 420 for detecting migration and leakage of leachate 106 and contaminants 108. In a preferred embodiment, migration sensor 420 comprises a sensor incorporating fiber optic coupled optical spectroscopy functionality for measuring, for example, volatile organic compounds (VOCs) that may have leaked through smart casing section 400A of the inventive barrier. However other migration sensors suitable for measuring chemical migration, and emission of VOCs and the like are contemplated as being within the scope of the present invention. As indicated in FIG. 4, migration sensor 420 is preferably configured to feed data to real-time data management system 414 for processing and analysis.

A preferred embodiment of smart casing section 400A also includes one or more predictive sensors 422 for identifying failure precursors in barrier filler 252 and/or in smart casing section 400A. One preferred predictive sensor 422 is one that measures changes in the dielectric permeability and/or permittivity of barrier filler 252. Changes in dielectric permeability and/or permittivity are typically precursors to macroscopic changes in performance of barrier filler 252, and thus of the containment system as a whole. In an alternative embodiment, predictive sensor 422 comprises electrical source and antenna arrays (not shown) used to measure changes in resistivity of barrier filler 252. A change in resistivity from a baseline measurement taken at installation would indicate a break or pocket in barrier filler 252.

Predictive sensors 422 preferably also comprise a sacrificial cathode or the like for detecting conduction paths through smart casing section 400A. Existence of a conduction path through smart casing section 400A indicates that a failure of smart casing section 400A will ultimately occur. Because galvanic action only occurs when there is a conduction path, galvanic action at the sacrificial cathode serves to predict failure of smart casing section 400A. As indicated in FIG. 4, predictive sensors 422 are preferably configured to feed data to real-time data management system 414 for processing and analysis. Note that this invention contemplates as within its scope any sensor having analogous predictive capabilities, and this invention should accordingly not be construed to be limited to those embodiments enumerated and discussed herein.

The containment system also provides the benefit of a barrier having multiple layers. In the instance of metal casings filled with concrete or other suitable material, at least three layers of containment are provided. The first layer comprises the top portions of the casings. The second layer comprises the concrete or other suitable material which fills the casings as well as the interlock structures. In addition to providing a second layer of containment, the concrete further enhances the strength of the barrier. The third layer comprises the bottom portions of the casings. The sensors which are indicative of the integrity and continuity of the first layer can also be applied to the second and third layers. The resulting barrier is continuous, durable, verifiable and may be instrumented to effectively measure its long-term integrity and performance.

The present invention has been described in terms of buried waste, but the systems and methods of the present invention have other applications. For instance, a barrier having perforated casings may be using in mining operations to collect the material being mined. When the collection of the mined material reaches a predetermined level, it is easily extracted from collectors in the perforated casings. Other applications include perforated barriers used for agricultural purposes. For example, the water used to irrigate an agricultural area typically drains in a particular location. A containment barrier having perforated casings can be installed in the drainage area. The smart casings may be supplied with modules that function to remove contaminants such as fertilizer and pesticide from the irrigation water.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes that come within the meaning and range of equivalency of the claims are to be embraced within their scope.

We claim:

1. A containment system for containing a zone of interest, said containment system comprising:

a plurality of substantially parallel tubes, each of said plurality of substantially parallel tubes adjoining at least one other substantially parallel tube so that said plurality of substantially parallel tubes collectively forms a continuous barrier of pre-determined configuration;

barrier filler substantially filling each of said plurality of substantially parallel tubes; and a plurality of walls, said plurality of walls cooperating with said continuous barrier to substantially contain the zone of interest.

2. The containment system according to claim 1, wherein said plurality of substantially parallel tubes comprise tunnels, each of said tunnels partly intersecting at least one other tunnel.

3. The containment system according to claim 1, wherein each of said plurality of substantially parallel tubes comprises a guide structure for guiding at least one adjacent substantially parallel tube into position.

4. The containment system according to claim 3, wherein said guide structure comprises complementary interlocking structure, the complementary interlocking structure of a first substantially parallel tube cooperating with corresponding complementary interlocking structure of a second substantially parallel tube so as to guide said second substantially parallel tube into position.

5. The containment system according to claim 1, wherein each of said plurality of substantially parallel tubes comprises a plurality of casing sections.

6. The containment system according to claim 5, wherein said plurality of casing sections comprise steel.

7. The containment system according to claim 1, wherein each of said plurality of substantially parallel tubes comprises complementary interlocking structure so that said substantially parallel tubes are interlocked with each other, said barrier filler substantially filling interlock spaces formed when said substantially parallel tubes are interlocked.

8. The containment system according to claim 1, wherein said pre-determined configuration comprises a substantially horizontal plane located underneath the zone of interest.

9. The containment system according to claim 8, wherein said plurality of walls comprises four walls, each wall being substantially perpendicular and adjacent to a corresponding edge of said continuous barrier so that said walls cooperate with said continuous barrier to substantially contain the zone of interest.

10. The containment system according to claim 1, wherein said pre-determined configuration substantially comprises an open-ended channel, and said plurality of walls comprises two walls, each wall being adjacent to an end of said open-ended channel so that said plurality of walls cooperate with said continuous barrier to substantially contain the zone of interest.

11. The containment system according to claim 1, further comprising a plurality of sensors embedded in said plurality of substantially parallel tubes, wherein said plurality of sensors are in operative communication with a real-time data management system.

12. The containment system according to claim 1, wherein said barrier filler comprises at least one of: grout; cement; concrete; bentonite-based material; modified cement; polysiloxane; and acrylic polymers.

13. The containment system according to claim 1, wherein said continuous barrier defines at least one opening, and a leachate flows from the zone of interest through said continuous barrier via said opening.

14. A waste management system for containing a zone of interest, comprising:
   a plurality of parallel tubes connected to each other to collectively form a barrier of pre-determined configuration, said barrier defining at least one opening;
   barrier filler substantially filling said barrier;
   a plurality of walls, said plurality of walls cooperating with said barrier to substantially contain the zone of interest;
   a leachate collection system for collecting leachate from the zone of interest, said leachate collection system in fluid communication with said at least one opening of said barrier; and
   a monitoring system, said monitoring system configured for monitoring at least said barrier and the zone of interest.

15. The waste management system according to claim 14, wherein said monitoring system comprises at least a first set and second set of sensors in operative communication with a real-time data management system.

16. The waste management system according to claim 15, wherein said first set of sensors is configured to monitor the zone of interest and said second set of sensors is configured to monitor said barrier.

17. The waste management system according to claim 16, wherein said first set of sensors comprises a presence/concentration sensor, a radiation detection and measurement sensor, and a distribution sensor.

18. The waste management system according to claim 16, wherein said second set of sensors comprises a joint integrity sensor, a migration sensor, and a predictive sensor.

19. The waste management system according to claim 14, wherein said monitoring system additionally monitors said plurality of walls.

20. The waste management system according to claim 14, wherein said leachate collection system comprises an accumulation tank and associated piping.

21. The waste management system according to claim 20, further comprising a leachate processing system for evaluating and processing said leachate, said leachate processing system being in fluid communication with said accumulation tank.

22. A containment barrier to facilitate management of leachate flow from a zone of interest, comprising:
   a plurality of substantially parallel tubes, each tube of the plurality being laterally interlocked to at least one other tube along their respective lengths to collectively form a barrier segment adjacent to the zone of interest;
   a leachate flow system for managing flow of said leachate through said barrier segment, said leachate flow system disposed in said barrier segment; and
   a barrier filler substantially filling said barrier segment.

23. The containment barrier according to claim 22, wherein said leachate flow system comprises at least one of said plurality of substantially parallel tubes defining at least one void, said at least one void being in fluid communication with the zone of interest, said leachate flowing from the zone of interest into said at least one void.

24. The containment barrier according to claim 23, further defining at least one outlet in fluid communication with said at least one void.

25. The containment barrier according to claim 24, wherein said outlet is configured to allow at least a portion of said leachate to selectively flow from said at least one void through said outlet.

26. The containment barrier according to claim 23, further comprising at least one filter interposed between the zone of interest and said at least one void.

27. The containment barrier according to claim 22, wherein said leachate flow system comprises at least one perforated portion of at least one of said plurality of substantially parallel tubes, said at least one perforated portion defining at least one void, and said leachate flowing from the zone of interest through said perforated portion into said at least one void.

28. The containment barrier according to claim 22, further comprising a monitoring system comprising at least one sensor carried by at least one tube of said substantially parallel plurality of tubes for monitoring at least one of the zone of interest and said leachate flow system.

29. The containment barrier according to claim 28, wherein said monitoring system comprises at least one sensor in operative communication with a real-time data management system.

30. The containment barrier according to claim 22, wherein each of said plurality of substantially parallel tubes comprises a plurality of casing sections.

31. The containment barrier according to claim 30, wherein said plurality of casing sections comprise steel.

32. The containment system according to claim 22, wherein said barrier filler comprises at least one of: grout; cement; concrete; bentonite-based material; modified cement; polysiloxane; and acrylic polymers.

33. A containment system for containing a zone of interest, the containment system comprising:
   a barrier for controlling migration of leachate from the zone of interest, said barrier comprising a plurality of substantially parallel tubes, each tube at least indirectly connected to at least one other tube of said plurality to form a continuous barrier; and
   a plurality of walls, said plurality of walls being formed separately from said barrier and cooperating with said barrier to substantially contain the zone of interest.

34. The containment system according to claim 33, wherein each of said plurality of substantially parallel tubes is substantially filled with a barrier filler.

35. The containment system according to claim 34, wherein each of said plurality of connected substantially parallel tubes comprises a plurality of casing sections.

36. The containment system according to claim 35, wherein said plurality of casing sections comprise steel.

37. The containment system according to claim 34, further comprising a monitoring system comprising at least one sensor carried by at least one tube of said plurality of substantially parallel tubes for monitoring at least one of the zone of interest and said barrier.

38. The containment system according to claim 33, wherein said plurality of walls comprises a plurality of connected tubes, wherein said plurality of walls are continuously connected with said barrier.

* * * * *